Patented Aug. 7, 1951

2,563,708

UNITED STATES PATENT OFFICE 2,563,708

AQUEOUS EMULSIONS OF CELLULOSE ESTERS

Carlton L. Crane, Rochester, N. Y., assignor to Eastman Kodak Company, Rochester, N. Y., a corporation of New Jersey No Drawing. Application February 27, 1948, Serial No. 11,863

13 Claims. (Cl. 106—170)

This invention relates to aqueous emulsions of organic acid esters of cellulose in which a salt of cellulose sulfate is employed as the emulsifier.

It has been previously recognized that fibrous materials, such as cloth, paper, leather, or the like, were rendered waterproof or water repellent, or both, by coating those materials with cellulose ester coatings. It has been also previously recognized that aqueous emulsions of those esters have been very useful for supplying such coatings. Heretofore, however, substantially all of the emulsions of cellulose esters described in the prior art have lacked stability and, therefore, have not been useful in commercial application.

One object of my invention is to provide a method of preparing aqueous emulsions of cellulose esters which are stable. Another object of my invention is to provide emulsions which are suitable for application to fibrous materials for rendering the same waterproof or water-repellent. A further object of my invention is to provide emulsions with high solids content so as to form heat reversible gels, making possible the rapid setting or gelling of the emulsions when coated into air. A still further object of my invention is to provide aqueous emulsions of cellulose esters in which waxes may be incorporated without any exudation thereof occurring. A still further object of my invention is to provide a method of preparing aqueous solutions of cellulose esters employing salts of cellulose sulfates. Other objects of my invention will appear herein.

I have found that the salts of cellulose sulfates are eminently suitable for use in preparing aqueous emulsions of cellulose esters. These emulsions are best prepared by dissolving the cellulose esters in a water-immiscible organic solvent, which may or may not have water-miscible solvent mixed therewith, and then mixing the solution thus prepared with an aqueous solution of the salt of the cellulose sulfate, thus forming an aqueous emulsion of the desired characteristics.

The stabilizing or emulsifying agents which are useful in accordance with my invention may be prepared by the method described in Belgian Patents Nos. 448,249 and 461,916 of Dr. Georges Frank. In that method the cellulose sulfate is prepared and then neutralized by a solution of base in aqueous alcohol or other solvent. As pointed out there, if an alkali-metal salt is desired, potassium or sodium hydroxide is employed as the base, whereas if an amine salt is employed, the amine base is used for neutralizing the cellulose sulfate formed. Emulsifying agents which I have found to be useful in preparing aqueous emulsions of cellulose esters are the salts of cellulose sulfates prepared by neutralizing cellulose sulfate with any of the following bases: di-n-butyl amine, N,N-diethyl cyclo-hexyl amine, potassium hydroxide, sodium hydroxide, tri-n-amyl amine, tri-isoamyl amine, di-2-ethyl hexyl amine, tri-n-butyl amine, n-butyl amine, methylamine, ethylamine, diethyl amine, tri-isopropyl amine, and diisopropylamine.

The esters, the emulsions of which are prepared in accordance with my invention, are preferably the lower fatty acid esters of cellulose, such as cellulose acetate, cellulose acetate propionate, cellulose acetate butyrate, cellulose propionate, cellulose butyrate and the like. However, the preparation of emulsions of cellulose derivatives is within the scope of my invention. For instance, emulsions of cellulose nitrate, cellulose acetate stearate, ethyl cellulose, cellulose phthalate, or in fact any cellulose derivative which is soluble in a water-immiscible organic solvent or a combination of water-miscible and water-immiscible solvents and insoluble in water can be prepared in accordance with my invention.

The emulsion in accordance with my invention is prepared by dissolving the cellulose ester in an organic solvent, or a mixture of organic solvents. The amount of solvent used is ordinarily limited to the minimum amount necessary to promote good solution and will vary with the viscosity of the ester used. There is thereupon rapidly stirred into the solution of the ester in the solvent or combination of solvents a water solution or a water-alcohol solution of the salt of cellulose sulfate, the latter being present in sufficient quantity to prevent breaking of the emulsion. The amount of water used can be any desired quantity up to 70% of the total weight of the liquid present. The amount of the salt of cellulose sulfate used varies from .1 to 20% of the total weight of the solvent which is employed. Although a small amount of solids such as 1% or more may be used, in accordance with my invention emulsions may be prepared having from that 1% to a high solids content, such as up to 35%, and these emulsions are thus adapted to form heat reversible gels. Thus, when the emulsions are cast into sheets or coatings in the air, the coating or sheet thus formed sets or chills rapidly and in the case of sheets, the uncured sheet may be stripped from the coating surface almost immediately after it has been cast. The emulsions prepared in accordance with my invention are highly stable and will keep for extended periods of time. These emulsions are also tolerant of wax in amounts up to 5% of the weight of the ester, thus contributing to the water repellent characteristics of the composition. Emulsions containing 0.5-5% of wax when coated over black paper have been found to exhibit no wax exudation after five months at ordinary temperatures. Paraffin wax is especially suitable for addition to emulsions in accordance with my invention although other waxes may be employed, preferably being incorporated by dissolving in the organic solvent in which the cellulose ester is dissolved.

The emulsions of my invention are particularly useful for coating fibrous materials, such as fibers, textile fabrics, paper, leather, or the like, to form a waterproof or water-repellent coating thereon. The material so coated may be repeatedly washed without losing the water repellency. Emulsions in accordance with my invention may be employed as vehicles for dyes or pigments or for use in printing pastes. In some cases it may be desirable that the emulsion of my invention be employed for preparing sheets or films. In cases where clarity is desired the amine salts of cellulose sulfate that exhibit both water and organic solvent solubility, are found to be the most useful emulsifiers, particularly the tri-n-butyl amine, di-n-butyl amine, tri-n-amyl amine, di-2-ethyl hexyl amine and N,N-diethylcyclohexyl amine, salts of the cellulose sulfate. In many cases, however, pigment, such as titanium dioxide, is incorporated in the emulsion composition and, in those cases, the clarity of the resulting product is not critical. The emulsions of my invention are also useful for preparing rods or tubes by dipping these into the emulsion compositions. Upon withdrawal of the tube the emulsion coating thereon sets rapidly on exposure to the air to form a hard, tough coating on drying at 140° F. In the coating of fabrics sleazy materials, such as scrim cloth, may be over-coated with aqueous emulsions in accordance with my invention without filling the interstices thereof.

The following examples illustrate the preparation of aqueous emulsions of cellulose esters in accordance with my invention:

Example 1

250 parts of cellulose triacetate having an acetyl content of 43.5% were dissolved in a Werner-Pfleiderer mixer of the type shown and described on page 169 of Kruger's Zelluloseazetate (1933) in a mixture of 900 parts of methylene chloride, 125 parts of propylene chloride, and 80 parts of methanol under gentle reflux. There was then added a solution of 30 parts of triphenyl phosphate dissolved in 100 parts of methylene chloride. After thorough mixing there was slowly added with agitation 140 parts of a mixture of 11.7 parts of cellulose di-n-butyl amine sulfate, 11.7 parts of methanol and 116.6 parts of distilled water. The agitation was continued until a thick, creamy emulsion formed which was found to gel rapidly when exposed as a thin layer to the air. Some of this emulsion was cast by extruding in the form of a thin sheet. This sheet upon drying was found to be clear and flexible.

Example 2

800 parts of cellulose acetate butyrate having an acetyl content of 13% and a butyryl content of 36% were dissolved in a mixture of 150 parts of n-butyl alcohol, 150 parts of n-butyl cellosolve and 1300 parts of toluene at 130-150° F. There was then added slowly with agitation 2000 parts of a 2.5% aqueous solution of cellulose potassium sulfate. A thick, creamy emulsion formed which when extruded into sheets and dried gave flexible, tough films.

Example 3

100 parts of cellulose acetate butyrate containing 6% of acetyl and 48.5% of butyryl and plasticized with 13.2 parts of di-n-butyl sebacate, and 19.7 parts of n-butyl stearate were dissolved in a mixture of 62 parts of N-butanol, 555 parts of toluene and 25 parts of chlorinated diphenyl (aroclor 5460). 2 parts of paraffin were also mixed in. 100 parts of a 5% aqueous solution of cellulose potassium sulfate were stirred into this solution. A heavy, creamy solution was obtained which was coated on black paper and dried. The coating exhibited no exudation of wax after five months at ordinary temperatures.

Example 4

28.6 parts of cellulose acetate having 38-39% acetyl, were dissolved in 17.2 parts of methyl alcohol and 77.1 parts of ethylene dichloride. 100 parts of a mixture of 5 parts of cellulose N,N-diethylcyclohexyl amine sulfate dissolved in 45 parts of distilled water and 50 parts of methanol were added slowly with agitation and the mixture stirred until a thick creamy emulsion was formed.

The emulsions prepared in accordance with my invention are convenient to use due to their property of rapidly gelling upon exposure to air in the form of a layer. It is thought that this exposure to the air lowers the temperature due to the evaporation of solvent so that gelling takes place. This coating, however, becomes fluid upon subjecting to an elevated temperature, such as 50° C. Therefore, if impregnation of fabrics is desired, this is conveniently accomplished by coating out a layer of the emulsion as described, which gels and which can be liquefied by subjecting to an elevated temperature. Upon thus liquefying the coating, impregnation of the cloth is obtained which gels again upon withdrawing the heat therefrom. I have found that the emulsion prepared in accordance with my invention remains stable over long periods of time, providing, of course, the composition is not exposed to the air so that the liquid present evaporates therefrom thus resulting in too high a solid-to-liquid ratio. It is desirable in compositions in accordance with my invention that the solid-to-liquid ratio stay below 1 to 3 to avoid gelling or setting of the emulsion. Otherwise, it is necessary to work with the emulsion at elevated temperature. By the use of elevated temperatures fabrics or paper may be coated with layers of compositions in accordance with my invention in good fluid form, which layers upon cooling set and may thereafter be readily dried to obtain the desired products.

What I claim and desire to secure by Letters Patent of the United States is:

1. An aqueous emulsion which comprises cellulose triacetate emulsified in a liquid mass essentially consisting of an organic solvent for the cellulose ester, water, and a dibutyl amine salt of cellulose sulfate as the emulsifying agent therein.

2. An aqueous emulsion of a lower fatty acid ester of cellulose which comprises the cellulose ester emulsified in a liquid mass essentially consisting of an organic solvent for the cellulose ester, water and a salt of cellulose sulfate and a base selected from the group consisting of the alkali metals and the aliphatic and cycloaliphatic amines of 1-12 carbon atoms having only carbon, hydrogen, and nitrogen, as the emulsifying agent therein.

3. An aqueous emulsion of a lower fatty acid ester of cellulose which comprises the cellulose ester emulsified in a liquid mass essentially consisting of an organic solvent for the cellulose ester, water and an alkali metal salt of cellulose sulfate as the emulsifying agent therein.

4. An aqueous emulsion of a lower fatty acid ester of cellulose which comprises the cellulose ester and not more than 5% of wax based on the ester emulsified in a liquid mass essentially consisting of an organic solvent for the cellulose ester, water and a salt of cellulose sulfate and a base selected from the group consisting of the alkali metals and the aliphatic and cycloaliphatic amines of 1-12 carbon atoms having only carbon, hydrogen, and nitrogen, as the emulsifying agent therein.

5. An aqueous emulsion which comprises cellulose triacetate emulsified in a liquid mass essentially consisting of an organic solvent for the cellulose triacetate, water and a salt of cellulose sulfate and a base selected from the group consisting of the alkali metals and the aliphatic and cycloaliphatic amines of 1-12 carbon atoms having only carbon, hydrogen, and nitrogen, as the emulsifying agent therein.

6. An aqueous emulsion which comprises cellulose acetate butyrate emulsified in a liquid mass essentially consisting of an organic solvent for the cellulose acetate butyrate, water and a salt of cellulose sulfate and a base selected from the group consisting of the alkali metals and the aliphatic and cycloaliphatic amines of 1-12 carbon atoms having only carbon, hydrogen, and nitrogen, as the emulsifying agent therein.

7. An aqueous emulsion which comprises cellulose acetate butyrate and a plasticizer emulsified in a liquid mass essentially consisting of an organic solvent for the cellulose acetate butyrate, water and a salt of cellulose sulfate and a base selected from the group consisting of the alkali metals and the aliphatic and cycloaliphatic amines of 1-12 carbon atoms having only carbon, hydrogen and nitrogen, as the emulsifying agent.

8. An aqueous emulsion which comprises cellulose acetate butyrate, a plasticizer and not more than 5% of wax, based on the cellulose ester emulsified in a liquid mass, essentially consisting of an organic solvent for the cellulose ester, water, and a salt of cellulose sulfate and a base selected from the group consisting of the alkali metals and the aliphatic and cycloaliphatic amines of 1-12 carbon atoms having only carbon, hydrogen, and nitrogen, as the emulsifying agent therein.

9. An aqueous emulsion which comprises cellulose triacetate and a plasticizer emulsified in a liquid mass essentially consisting of an organic solvent for the cellulose ester, water, and a salt of cellulose sulfate and a base selected from the group consisting of the alkali metals and the aliphatic and cycloaliphatic amines of 1-12 carbon atoms having only carbon, hydrogen, and nitrogen, as the emulsifying agent therein.

10. An aqueous emulsion which comprises cellulose triacetate emulsified in a liquid mass essentially consisting of an organic solvent for the cellulose ester, water, and a salt of cellulose sulfate and an amine selected from the group consisting of the aliphatic and cycloaliphatic amines of 1-12 carbon atoms having only carbon, hydrogen and nitrogen, as the emulsifying agent therein.

11. An aqueous emulsion which comprises cellulose triacetate, plasticizer and not more than 5% of wax, based on the cellulose ester emulsified in a liquid mass essentially consisting of an organic solvent comprising a mixture of methylene chloride, propylene chloride and methyl alcohol, water, and a salt of cellulose sulfate and an amine selected from the group consisting of the aliphatic and cycloaliphatic amines of 1-12 carbon atoms having only carbon, hydrogen, and nitrogen, as the emulsifying agent therein.

12. An aqueous emulsion which comprises cellulose acetate butyrate emulsified in a liquid mass essentially consisting of an organic solvent comprising butyl alcohol, butyl cellosolve, toluene, water, and a salt of cellulose sulfate and a base selected from the group consisting of the alkali metals and the aliphatic and cycloaliphatic amines of 1-12 carbon atoms having only carbon, hydrogen, and nitrogen as the emulsifying agent therein.

13. An aqueous emulsion which comprises cellulose triacetate emulsified in a liquid mass essentially consisting of an organic solvent for the cellulose ester, water and cellulose di-n-butyl amine sulfate.

CARLTON L. CRANE.

REFERENCES CITED

The following references are of record in the file of this patent:

FOREIGN PATENTS

| Number | Country | Date |
| --- | --- | --- |
| 699,085 | France | Feb. 10, 1931 |
| 334,567 | Great Britain | Sept. 8, 1934 |

OTHER REFERENCES

Chargoff et al.: "Journal Biol. Chem.," 122.